Patented Dec. 25, 1923.

1,478,790

UNITED STATES PATENT OFFICE.

PERCY R. MIDDLETON, OF NEW YORK, N. Y., ASSIGNOR OF ONE-HALF TO JOHN C. LALOR, OF NEW YORK, N. Y.; WILLARD A. LALOR EXECUTOR OF SAID JOHN C. LALOR, DECEASED.

PROCESS OF ROASTING SULPHIDE ORES.

No Drawing.  Application filed December 25, 1920.  Serial No. 432,845.

*To all whom it may concern:*

Be it known that I, PERCY R. MIDDLETON, a subject of the King of Great Britain, residing at New York, in the county of New York and State of New York, have invented certain new and useful Improvements in Processes of Roasting Sulphide Ores, of which the following is a specification.

In my copending application Serial No. 352,899, filed January 20, 1920, I have described and claimed a process applicable to the recovery from sulfur-bearing ores of such metals (copper, zinc, nickel, etc.) as form water-soluble sulfates. According to the said process in its preferred embodiment the ore is heated with access of air to a reacting temperature below the ignition point of the sulfur in the ore, and such temperature is maintained until the maximum proportion of the sulphide of the metal to be recovered has been oxidized to sulfate. In the application of the process to ferruginous ores or ore-mixtures the temperature of the charge is then increased sufficiently to decompose iron sulfate formed during the first operating stage, without substantial decomposition of the sulfate of the metal to be recovered. In the specific application of the process to ferruginous copper sulphide ores the charge is first roasted at a maintained temperature approximately 800–850° F. until the formation of copper sulfate has substantially attained a maximum; and is then further heated to 1100–1200° F. to decompose sulfate of iron, the copper content of the ore being further sulfatized during this second or high-temperature operating stage. The result accomplished by this treatment is the conversion of substantially the whole of the copper content of the ore into a condition of ready solubility either in water or in dilute sulfuric acid. For example in a typical operation in accordance with the said invention, up to 85% of the total copper content of the ore may be converted into the water-soluble form (sulfate) while 95–99% of the same is soluble in dilute sulfuric acid.

In the further treatment of the resulting sulfate solutions by electrolysis, the metal is deposited at the cathodes while an equivalent quantity of sulfuric acid is set free at the insoluble anodes. In case the manner of conducting the roast has been such as to yield in the final calcine substantially the maximum percentage of water-soluble sulfate, the requirements of sulfuric acid for the leaching operation will of course be at a minimum; and under such conditions there may occur an undesirable accumulation of dilute sulfuric acid, which under the particular conditions can neither be economically used nor readily disposed of. Accordingly the object of the present invention is so to modify the process of my application above referred to as to bring about a substantial balance, or any desired approximation thereto, between the production of sulfuric acid in the electrolytic step on the one hand and the process requirements for sulfuric acid in the leaching step on the other hand; the total recovery of the metal being in the meantime substantially maintained.

I have discovered that these highly desirable results may be economically and readily accomplished by the following modification of my prior process:

Assuming the ore to be treated to be of the ferruginous copper-sulphide type, it is roasted in the manner above set forth, and as more fully described in my copending application Ser. No. 352,899 mentioned above, the preferred conditions being such as to bring substantially the maximum proportion of the copper into the water-soluble state. Instead however of terminating the roast at this point, the temperature is then brought to the decomposition point of copper sulfate (which for the purposes of this example may be regarded as lying between 1200–1300° F.) and there maintained until the water-soluble copper content of the calcine has been reduced to the desired extent. The resulting calcine requires a correspondingly increased proportion of sulfuric acid for the leaching operation, and by properly controlling the roasting conditions, and particularly the duration of the final roasting step, it is readily possible to balance to any necessary degree of accuracy the process requirements for sulfuric acid with the acid yield in the electrolyzing step.

It will of course be understood that this balance does not necessarily bear a fixed and unvarying ratio to the metal content of the ore, since the usual process losses, as well as the varying composition of the gangue materials, must be taken into account. However, the balance is readily worked out for any specific case, it being as a rule necessary merely to prolong the final or sulfate-decomposing step of the roasting operation until the desired balance is reached. In this operation time and temperature are to some extent correlated factors, so that a shorter heating at a higher temperature may be equivalent to longer heating at a lower temperature. When the process is properly conducted the total metal-recovery from the ore is not diminished, and may in fact be somewhat increased. It is my discovery however that in order to accomplish the best recovery it is essential that the roasting conditions should be so controlled and regulated that at an intermediate stage of the process, immediately preceding the sulfate-decomposing roast the water-soluble content of the calcine should attain substantially the maximum proportion.

While the process is chiefly intended for the treatment of sulphide ores, it will be understood that mixtures of oxidized and sulphide ores may be treated with like results, provided the sulfur content of the ore or ore-mixture is sufficient to sulfatize the copper from the oxidized ore. The sulfur content may of course be readily adjusted by the addition of iron sulphide or equivalent sulfur bearing materials whenever the amount of sulfur normally carried by the ore is insufficient for the purposes of the invention.

It will be understood that the present invention is not restricted to the employment of the precise temperatures or other operating conditions described herein; and as stated above it is applicable to all such metals as yield water-soluble sulfates. The term "ore" is used to include concentrates and similar metallurgical products.

I claim:

1. Process of roasting sulphide ores, comprising heating the ore with access of air to a reacting temperature below the ignition point of the sulfur in the ore, maintaining such temperature until the maximum proportion of the sulphide of the metal to be extracted has been oxidized to sulfate, and thereafter decomposing a portion of the sulfate to establish the desired acid-balance in the process.

2. Process of treating ferruginous copper-sulphide ores, comprising roasting the ore at about 800–850° F. until the formation of copper sulfate has reached substantially the maximum; then further heating to 1100–1200° F. to decompose sulfate of iron with further sulfatizing of the copper content of the ore, and finally raising the temperature to decompose a portion of the copper sulfate, thereby establishing the desired acid-balance in the process.

3. In a process of roasting ores containing a sulphide of a metal yielding a water-soluble sulfate, the steps comprising subjecting the ore to a sulfatizing roast to effect substantially the maximum practicable conversion of the metal into sulfate, and thereafter decomposing, at a higher temperature, a sufficient proportion of the sulfate to establish the desired acid-balance in the process.

In testimony whereof, I affix my signature.

PERCY R. MIDDLETON.